July 20, 1965  V. J. CARISI  3,195,196
CORNER FASTENING

Filed April 19, 1963  3 Sheets-Sheet 1

INVENTOR.
VINCENT J. CARISI
BY Clark & Ott
Attorneys

July 20, 1965

V. J. CARISI 3,195,196

CORNER FASTENING

Filed April 19, 1963

INVENTOR.
VINCENT J. CARISI
BY
*Clark & Ott*
Attorneys

July 20, 1965 V. J. CARISI 3,195,196
CORNER FASTENING
Filed April 19, 1963 3 Sheets-Sheet 3

INVENTOR.
VINCENT J. CARISI
BY Clark Ott
Attorneys

United States Patent Office 3,195,196
Patented July 20, 1965

3,195,196
CORNER FASTENING
Vincent J. Carisi, 16 Ridge Drive, Glen Cove, N.Y.
Filed Apr. 19, 1963, Ser. No. 274,273
5 Claims. (Cl. 20—92)

This invention relates to a corner fastening for connecting interfitting parts together in a mitered corner construction.

An object of the invention is to provide a corner fastening adapted for securing together mitered parts with a corner member so as to provide a strong, durable and corner construction.

Another object of the invention is to provide a corner fastener in which mitered parts have interfitting engagement with a corner supporting member whereby the parts may be drawn and wedged tightly together.

Still another object of the invention is to provide in a corner fastening of said character mitered parts for supporting a panel, wall or the like which have interfitting engagement with a corner supporting member through an opening therein and with a wedging member wedged between said mitered parts and connected with an internally threaded member within the corner member for rigidly connecting the parts together.

Still another object of the invention is to provide a corner supporting member of tubular formation and with the internally threaded member having enlarged ends adapted for engagement against the inside face of said tubular member for preventing collapsing thereof with the tightening of the wedging member.

With the foregoing and other objects in view, reference is now made to the accompanying drawings in which the preferred embodiment of the invention is illustrated.

Figure 1:
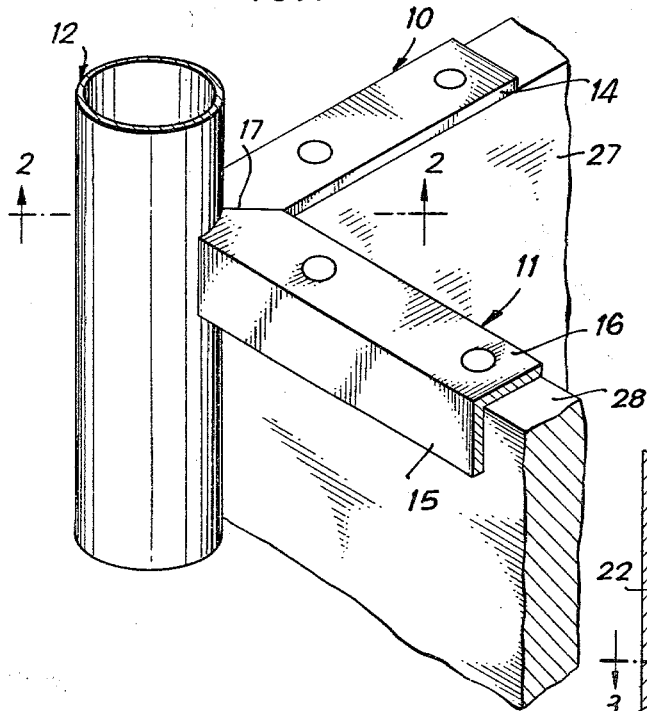
FIG. 1 is a perspective view of a corner fastening embodying the invention.

In the drawings, the invention is illustrated in its application to a corner fastening for connecting together a corner member and mitered parts for supporting panels, walls or the like forming part of an article of furniture, cabinet and the like or parts of a building.

The corner fastening includes angularly disposed frame parts 10 and 11 which are connected with a corner member 12 to provide a corner construction. The frame parts 10 and 11 are of angulated formation in section, the frame part 10 consisting of an outer flange 13 and an inwardly directed flange 14, while the frame part 11 consists of an outer flange 15 and an inwardly directed flange 16. The inwardly directed flanges 14 and 16 are mitered as at 17 and the mitered ends secured together in any desired manner such as by welding. The frame parts 10 and 11 are cut away at their mitered ends as at 18 and are arranged in right angular relation but it is to be understood that the same may be disposed in any desired acute or obtuse angular relation. As illustrated in FIGS. 1 to 4 of the drawings, the corner member 12 is of tubular formation and is formed with an opening 19 of a size and shape to fittingly receive the mitered end portions of the frame parts 10 and 11.

In order to connect the frame parts 10 and 11 with a corner member 12 of tubular formation, an internally threaded cooperating member 21 is provided which is formed with enlarged ends 22 and 23 having peripheral edges 24. The threaded member 21 extends axially within the tubular corner member with the enlarged ends 22 and 23 spaced apart for receiving the mitered ends of the frame parts 10 and 11 therebetween and with the peripheral edges 24 engaging against the inside face of said tubular member above and below the opening 19. A wedging member 25 is arranged between the flanges 13 and 15 filling the opening 19 between the frame parts 10 and 11 and with the wedging member projecting into the corner member 12 in spaced relation from the threaded member 21. The wedging member engages between said enlarged ends 22 and 23 and is apertured to receive a headed stud 26 which threadedly engages the threaded opening 29 in the member 21 for drawing the wedging member against the frame parts 10 and 11 and the enlarged ends 22 and 23 of the member 21 against the inside face of the corner member 12 to thereby securely connect the parts together in a corner construction.

It will be understood that the enlarged ends 22 and 23 may be of any desired shape to fittingly engage within the corner member 12 in the region of the opening 19 and which functions to prevent inward collapsing or distortion of the corner member when the wedging member 25 is drawn toward the threaded member 21 by the tightening of the stud 26. The internally threaded member 21 together with the enlarged ends 22 and 23 may be inserted in position through the opening 19 or through an end of the corner member. This renders it convenient for disposing the said member in proper position within the corner member for assembling the frame parts 10 and 11 therewith.

Figure 2:
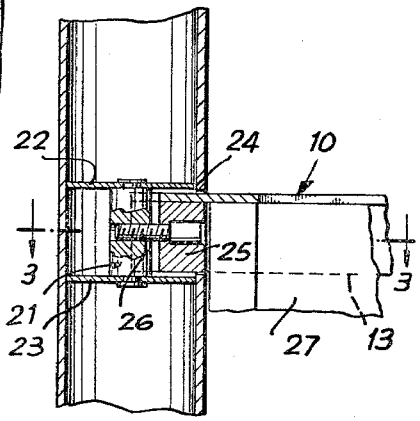
FIG. 2 is a fragmentary vertical sectional view taken approximately on line 2—2 of FIG. 1.
Figure 3:
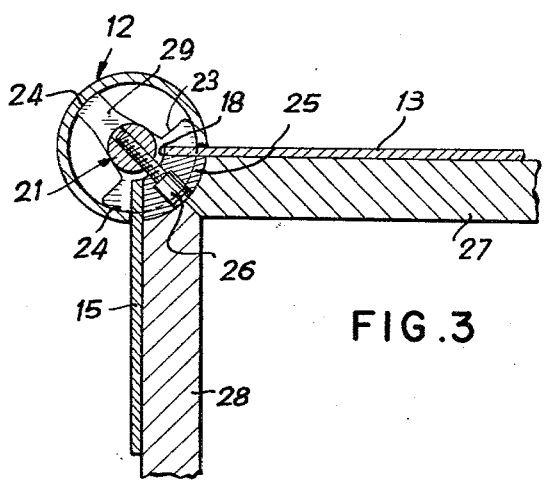
FIG. 3 is a fragmentary horizontal sectional view taken approximately on line 3—3 of FIG. 2.
Figure 4:
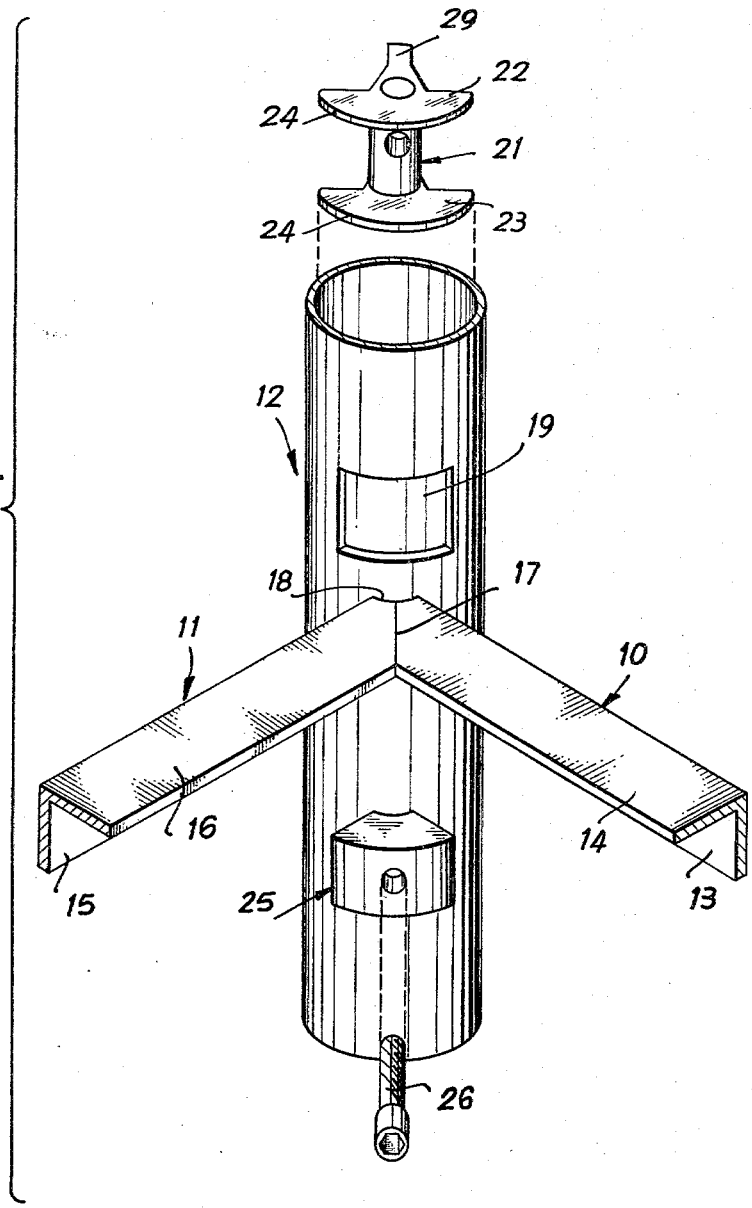
FIG. 4 is an enlarged perspective view showing the part in separated juxtaposition.

The frame parts 10 and 11 may serve to retain panels, walls or the like such as the walls 27 and 28 fragmentarily illustrated in FIGS. 1 to 3 inclusive of the drawings with the frame parts extending between corner members 12 at the ends of the frame parts 10 and 11. This construction has the advantage that the head of the stud 26 is arranged between the frame parts 10 and 11 in concealed relation by the panels 27 and 28 so as to prevent unauthorized loosening of the stud.

Figure 5:
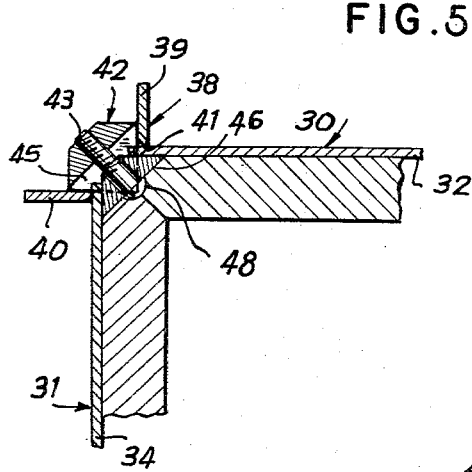
FIG. 5 is a view similar to FIG. 3 showing a modified form of corner fastening constructed in accordance with the invention.
Figure 6:
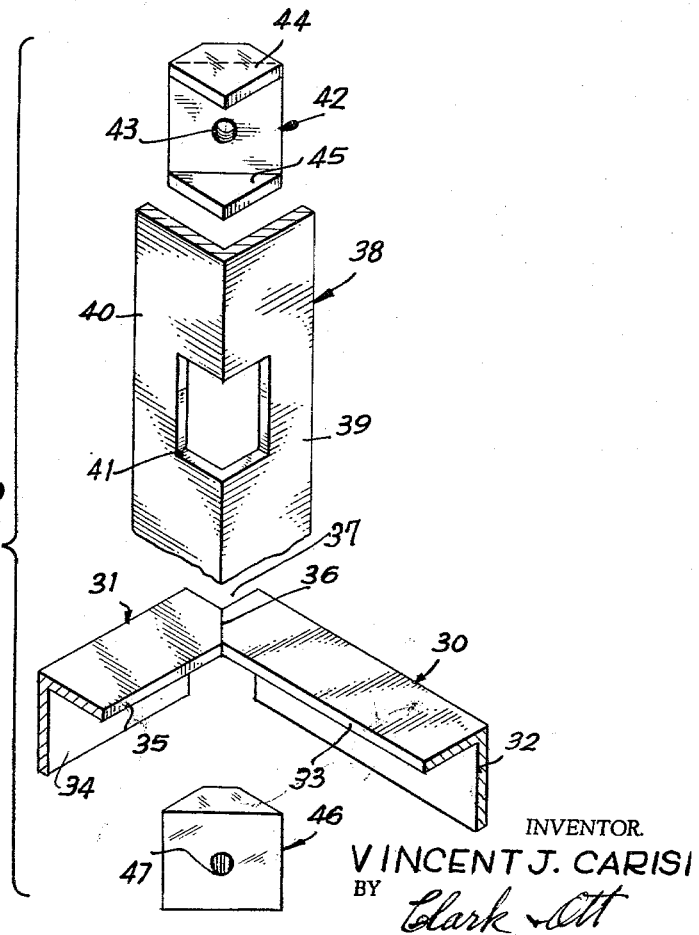
FIG. 6 is a fragmentary perspective view showing the parts in separated juxtaposition.

While the corner member 12 shown in FIGS. 1 to 4 inclusive of the drawings is of annular formation in cross-section, it is to be understood that the same may be of any desired tubular formation or the same may be of angular formation in section as shown in FIGS. 5 and 6 of the drawings.

In this modification of the invention the corner fastening includes angularly disposed frame parts 30 and 31, the frame parts 30 consisting of an outer flange 32 and an inwardly directed flange 33, while the frame part 31 consists of an outer flange 34 and an inwardly directed flange 35. The inwardly directed flanges 33 and 35 are mitered as at 36 and have their mitered ends cut away as at 37. The corner member 38 in this embodiment is of right angular formation in section consisting of side flanges 39 and 40 which are formed at the juncture thereof with an opening 41 of a size and shape to fittingly receive the mitered end portions of the frame parts 30 and 31. Arranged between the side flanges 39 and 40 of the corner member 38 is an axially extending cooperating member 42 having a threaded opening 43 and enlarged upper and lower ends 44 and 45 which engage against the said side flanges above and below the opening 41. The enlarged upper and lower ends 44 and 45 are of angulated formation in plan corresponding to the sectional formation of said corner member 38 whereby the same fit thereagainst and spaces the member 38 from the mitered inner end of the frame parts 30 and 31. A wedging member 46 corresponding to the wedging member 25 in the previous form of the invention is provided which is arranged between the flanges 32 and 33 of the frame parts 30 and 31 and which fills the opening 41 between said frame parts. The wedging member projects through the opening 41 with the inner end thereof disposed between the flanges 44 and 45 of the member 42. The wedging member 46 is apertured to receive a headed stud 48 which threadedly engages the threaded opening 43 in the member 42 for drawing the wedging member against the flanges 32 and 33 of the frame parts 30 and 31 and the flanges 44 and 45 of the member 42 against the flanges 39 and 40 of the corner member 38 to thereby securely connect the parts together in a corner construction.

What is claimed is:

1. A corner fastening of the aforesaid character comprising, a corner member having a transversely extending opening formed with spaced side edges and spaced upper and lower edges, a cooperating member extending longitudinally of said corner member having upper and lower enlarged ends extending transversely of said corner member with each of the enlarged ends having peripheral edge portions disposed in engagement with said corner member, angularly disposed frame parts each having a side flange and an inwardly directed flange, said inwardly directed flanges having mitered ends secured together and extending into said opening and between said enlarged ends and with the said flanges of said frame parts disposed against the side edges respectively of said opening, a wedging member arranged in said opening between said upper and lower enlarged ends and in abutting relation with said side flanges, and means fastening said wedging member to said cooperating member between the enlarged ends thereof and wedging the side flanges of said frame parts against the side edges respectively of said opening and tightening said enlarged ends against said corner member above and below said opening to thereby secure said parts together in tightened assembled relation with said corner member.

2. A corner fastening of the aforesaid character comprising, a tubular member having a transversely extending opening through the wall thereof and formed with spaced side edges and spaced upper end and lower edges, a cooperating member extending longitudinally of said tubular member having upper and lower enlarged ends extending transversely of said tubular member with each of the enlarged ends having peripheral edge portions disposed in engagement with the inner face of said corner member along diametrically disposed portions, angularly disposed frame parts each having a side flange and an inwardly directed flange, said inwardly directed flanges having mitered ends secured together and extending into said opening and between said enlarged ends and with the side flanges of said frame parts disposed against the side edges respectively of said opening, a wedging member arranged in said opening between said upper and lower enlarged ends and in abutting relation with said side flanges, and means fastening said wedging member to said cooperating member between the enlarged ends thereof and wedging the side flanges of said frame parts against the side edges respectively of said opening and tightening said enlarged ends against the inside face of said tubular member above and below said opening to thereby secure said parts together in tightened assembly relation with said tubular member, and said enlarged ends functioning to prevent distortion of said tubular member when said fastening means is tightened.

3. A corner fastening of the aforesaid character comprising, a corner member of angulated formation in section including side walls having a transversely extending opening formed with spaced side edges and spaced upper and lower edges, a cooperating member extending longitudinally of said corner member having upper and lower enlarged ends extending transversely of said corner member with each of the enlarged ends having peripheral edge portions disposed in engagement with one face of said corner member, angularly disposed frame parts each having a side flange and an inwardly directed flange, said inwardly directed flanges having mitered ends secured together and extending into said opening and between said enlarged ends and with the side flanges of said frame parts disposed against the side edges respectively of said opening, a wedging member arranged in said opening between said upper and lower enlarged ends and in abutting relation with said side flanges, and means fastening said wedging member to said cooperating member having said enlarged ends and wedging the side flanges of said frame parts against the side edges respectively of said opening and tightening said enlarged ends against said corner member above and below said opening to thereby secure said parts together in tightened assembled relation with said corner member.

4. A corner fastening of the aforesaid character comprising, a corner member having a transversely extending opening formed with spaced side edges and spaced upper and lower edges, a cooperating member extending longitudinally of said corner member having a threaded opening and upper and lower enlarged ends extending transversely of said corner member with each of the enlarged ends having peripheral edge portions disposed in engagement with said corner member, angularly disposed frame parts each having a side flange and an inwardly directed flange, said inwardly directed flanges having mitered ends secured together and extending into said opening and between said enlarged ends and with the side flanges of said frame parts disposed against the side edges respectively of said opening, a wedging member arranged in said opening between said upper and lower enlarged ends and in abutting relation with said side flanges and having an opening extending therethrough, and a headed stud arranged in said opening in said wedging member with the head thereof disposed against a side face thereof and threadedly engaging said threaded opening in said cooperating member having said enlarged ends and wedging the side flanges of said frame parts against the side edges respectively of said opening and tightening said enlarged ends against said corner member above and below said opening to thereby secure said parts together in tightened assembled relation with said corner member.

5. A corner fastening of the aforesaid character comprising, a tubular member having a transversely extending opening through the wall thereof and formed with spaced side edges and spaced upper and lower edges, a cooperating member extending longitudinally of said tubular member having a threaded opening and upper and lower enlarged ends with peripheral edge portions disposed in engagement with the inner face of said corner member along diametrically disposed portions, angularly disposed frame parts each having a side flange and an inwardly directed flange, said inwardly directed flanges having mitered ends secured together and extending into said opening and between said enlarged ends and with the side flanges of said frame parts disposed against the side edges respectively of said openings, a wedging member arranged in said opening between said upper and lower enlarged ends and in abutting relation with said side flanges and having an opening extending therethrough, and a headed stud arranged in said opening in said wedging member with the head thereof disposed against a side face thereof and threadedly engaging said threaded opening in said cooperating member having said enlarged ends and wedging the side flanges of said frame parts against the side edges respectively of said opening and tightening said enlarged ends against the inside face of said tubular member above and below said opening therein to thereby secure said parts together in tightened assembled relation with said tubular member, and said enlarged ends functioning to prevent distortion of said tubular member when said stud is tightened in said threaded opening.

References Cited by the Examiner
UNITED STATES PATENTS

| | | | |
|---|---|---|---|
| 676,469 | 6/01 | McLoughlin | 20—56.3 |
| 1,236,202 | 8/17 | Murnane | 20—56.3 |
| 2,674,769 | 4/54 | Carisi | 189—36 X |
| 3,021,115 | 2/62 | Dake | 256—65 |

JACOB L. NACKENOFF, *Primary Examiner.*